US008156626B1

(12) United States Patent
Doty

(10) Patent No.: US 8,156,626 B1
(45) Date of Patent: Apr. 17, 2012

(54) TAB REMOVAL DEVICE

(76) Inventor: Dale E. Doty, Cheyenne, WY (US)

( * ) Notice: Subject to any disclaimer, the term of this patent is extended or adjusted under 35 U.S.C. 154(b) by 0 days.

(21) Appl. No.: 13/290,422

(22) Filed: Nov. 7, 2011

(51) Int. Cl.
*B23P 11/00* (2006.01)

(52) U.S. Cl. ................ 29/267; 29/268; 29/270; 29/278; 269/3; 269/6

(58) Field of Classification Search .................... 29/267, 29/257, 261, 268, 270, 278, 280; 269/3, 269/6
See application file for complete search history.

(56) References Cited

U.S. PATENT DOCUMENTS

| | | | | |
|---|---|---|---|---|
| 3,460,411 | A | | 8/1969 | Dyer |
| 4,287,794 | A | | 9/1981 | Kubach |
| 4,309,921 | A | | 1/1982 | Miller |
| 4,524,646 | A | | 6/1985 | Kimberlin, Jr. |
| D284,161 | S | | 6/1986 | DeLano |
| 4,602,418 | A | * | 7/1986 | Bone et al. ................... 29/566.1 |
| 4,932,638 | A | * | 6/1990 | Chen ................................ 269/6 |
| 5,205,194 | A | | 4/1993 | Rodney |
| 5,555,778 | A | | 9/1996 | Otters |
| 6,019,020 | A | * | 2/2000 | Liou ............................... 81/407 |
| 6,122,810 | A | * | 9/2000 | McInnes .......................... 29/264 |
| 6,216,326 | B1 | * | 4/2001 | Ritter et al. ..................... 29/252 |
| 6,473,955 | B1 | * | 11/2002 | Huang ............................ 29/268 |
| 7,017,894 | B1 | * | 3/2006 | Lin .................................. 269/6 |
| 7,373,858 | B1 | | 5/2008 | Hawkins |
| 7,469,456 | B2 | * | 12/2008 | Warfield ......................... 29/268 |

* cited by examiner

*Primary Examiner* — Lee D Wilson
(74) *Attorney, Agent, or Firm* — Neustel Law Offices

(57) ABSTRACT

A tab removal device for efficiently and securely removing tabs from objects such as soda or beer cans. The tab removal device generally includes a handle and a trigger member which are pivotally secured to each other in a crossing manner by a pivot member. A bias member is provided which compresses when the trigger member is activated and will act to revert the trigger member to its original position absent force. A horizontal member is attached to the handle by a fastener and acts to house a clamp member, which includes teeth at its second end. The horizontal member will also include a frontal opening for insertion of the tab of a can. The trigger member will generally include teeth at its second end which, when activated, will compress and grip the tab of the can against the teeth of the clamp member and pull the tab off the can.

20 Claims, 5 Drawing Sheets

TAB REMOVAL DEVICE

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a tab removal device and more specifically it relates to a tab removal device for efficiently and securely removing tabs from objects such as soda or beer cans.

2. Description of the Related Art

Any discussion of the related art throughout the specification should in no way be considered as an admission that such related art is widely known or forms part of common general knowledge in the field.

Cans have been in use for many years to store various types of beverages. Generally, cans will include a tab at their upper ends to assist in opening the top of the can so that the beverage may be consumed. The tab is generally pulled away only enough to open the can, but otherwise left attached to the can.

When recycling cans, it is often desirable to remove the tabs from the cans being provided for recycling. The tabs have various uses, including for making jewelry and to provide playthings for children. However, it is often difficult and/or cumbersome to remove tabs from large quantities of cans. There does not appear to be a tool which allows the safe and efficient removal of can tabs in large quantities. When using one's hands, a person removing tabs can often suffer injuries such as cuts and scrapes.

Because of the inherent problems with the related art, there is a need for a new and improved tab removal device for efficiently and securely removing tabs from objects such as soda or beer cans.

BRIEF SUMMARY OF THE INVENTION

The invention generally relates to a tab removal device which includes a handle and a trigger member which are pivotally secured to each other in a crossing manner by a pivot member. A bias member is provided which compresses when the trigger member is activated and will act to revert the trigger member to its original position absent force. A horizontal member is attached to the handle by a fastener and acts to house a clamp member, which includes teeth at its second end. The horizontal member will also include a frontal opening for insertion of the tab of a can. The trigger member will generally include teeth at its second end which, when activated, will compress and grip the tab of the can against the teeth of the clamp member and pull the tab off the can.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
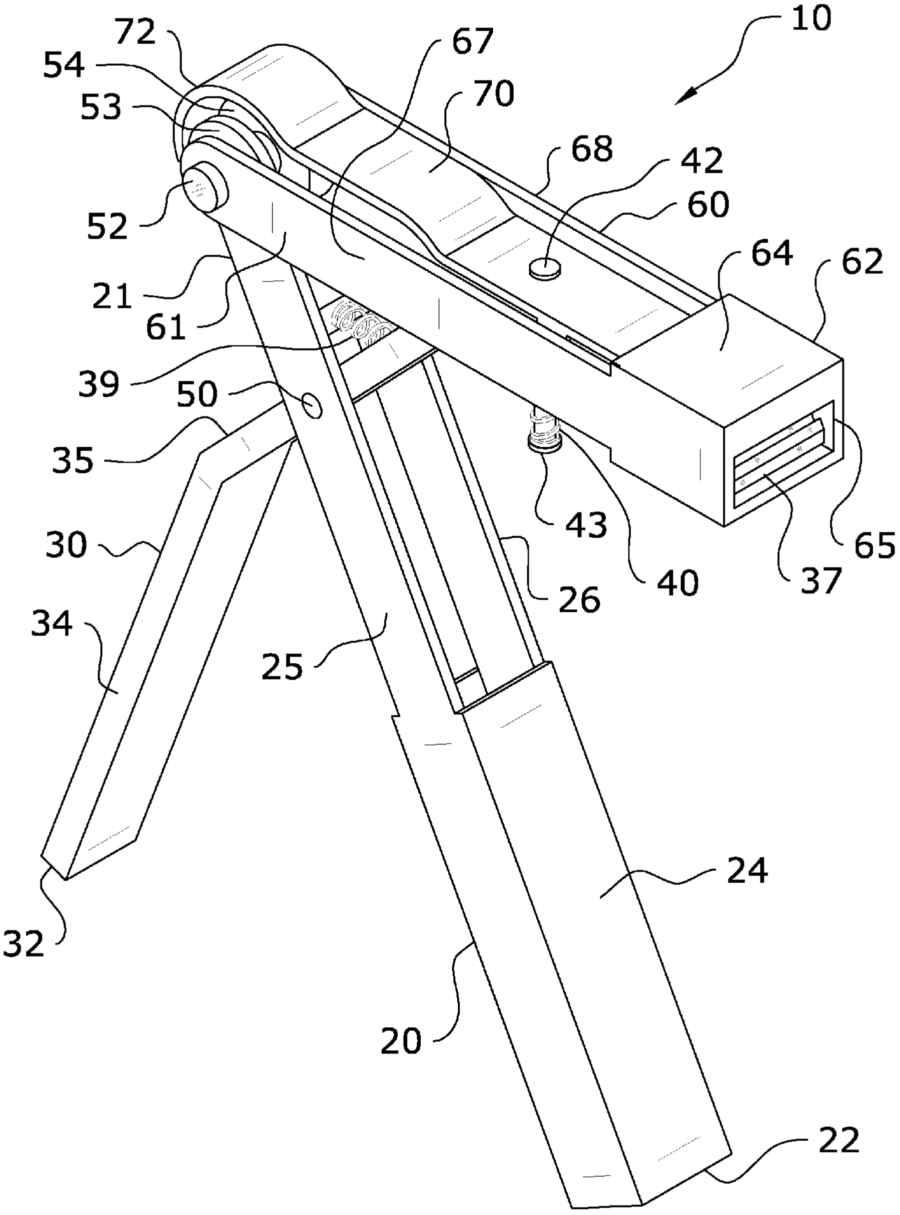
FIG. 1 is an upper perspective view of the present invention.

Turning now descriptively to the drawings, in which similar reference characters denote similar elements throughout the several views, FIGS. 1 through 5 illustrate a tab removal device 10, which comprises a handle 20 and a trigger member 30 which are pivotally secured to each other in a crossing manner by a pivot member 50. A handle bias member 39 is provided which compresses when the trigger member 30 is activated and will act to revert the trigger member 30 to its original position absent force. A horizontal member 60 is attached to the handle 20 by a fastener 52 and acts to house a clamp member 70, which includes teeth 74 at its second end 73. The horizontal member 60 will also include a frontal opening 65 for insertion of the tab 13 of a can 12. The trigger member 30 will generally include teeth 37 at its second end 32 which, when activated, will compress and grip the tab 13 of the can 12 against the teeth 74 of the clamp member 70 and pull the tab 13 off the can 12.

B. Handle

As shown in FIG. 1, the present invention will generally include a handle 20 which may be gripped while the present invention is in use. The handle 20 will generally be configured diagonally with respect to the horizontal member 60 of the present invention and includes a first end 21 and a second end 22. The first end 21 of the handle 20 will generally be attached to the first end 61 of the horizontal member 60 via a fastener 52. A washer 53 may also be utilized in connection with the fastener 52 in securing the handle 20 to the horizontal member 60. The fastener 52 will also generally extend through a bearing 54.

The handle 20 will generally include an enclosed portion 24 covering a portion of its body adjacent its second end 22. The enclosed portion 24 will generally be configured to be gripped by the operator of the present invention when in use and will act to house the second end 43 of the bias member 40 of the present invention.

The handle 20 will also generally include a first member 25 and a second member 26 which extend from the enclosed portion 24 to create a frame through which the trigger member 30 of the present invention extends. The first and second members 25, 26 will generally be comprised of elongated members which link the enclosed portion 24 of the handle 20 with the horizontal member 60 and trigger member 30 of the present invention. The handle 20, along with the present invention as a whole, may be comprised of various types of materials, such as metals, plastics, metal alloys and the like. Thus, the present invention should not be construed as being limited to any particular material. Similarly, the shape and size of the handle 20 (and the present invention as a whole) may vary for different application and thus should not be construed as being limited to the exemplary illustrations shown in the figures.

C. Trigger Member

Figure 4:
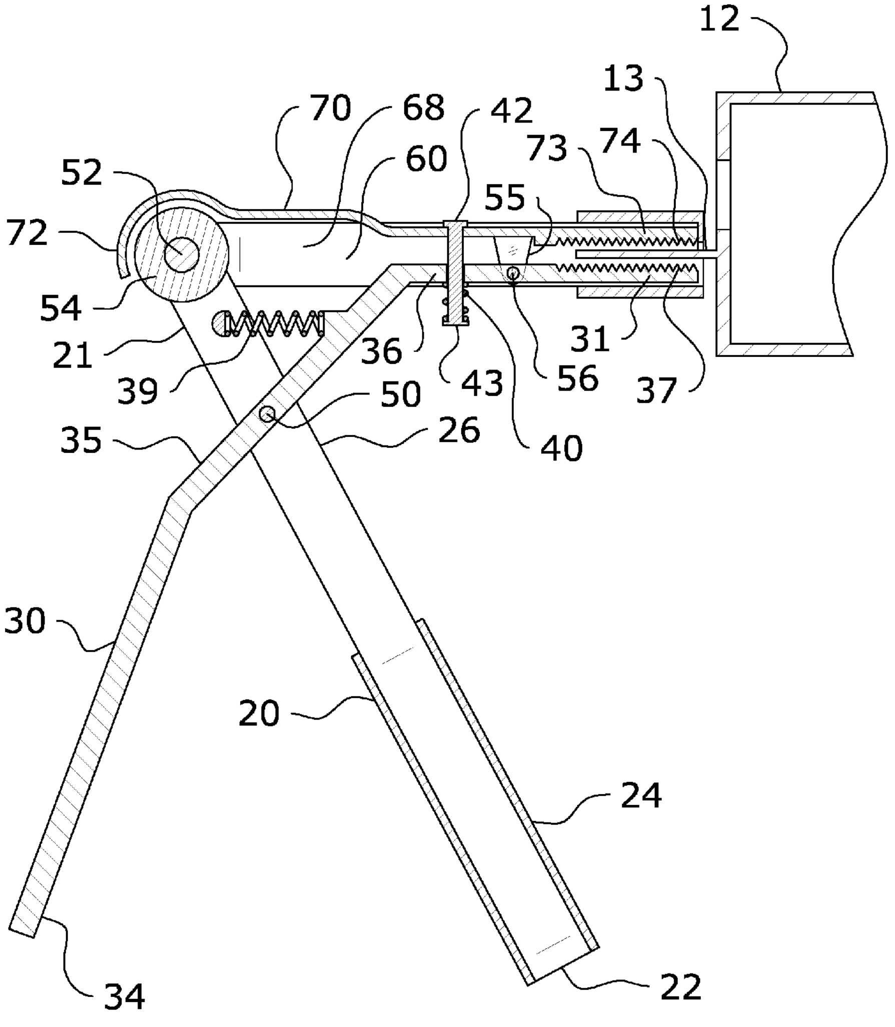
FIG. 4 is a side sectional view of the present invention in use.

The present invention will generally include a trigger member 30 which is utilized to allow the gripping action of the present invention to grasp and pull off tabs 13 from cans 12. As shown in FIG. 4, the trigger member 30 will generally include a first end 31 which includes teeth 37 for gripping a tab 13 and a second end 32 which may be gripped when the present invention is in use.

Figure 2:
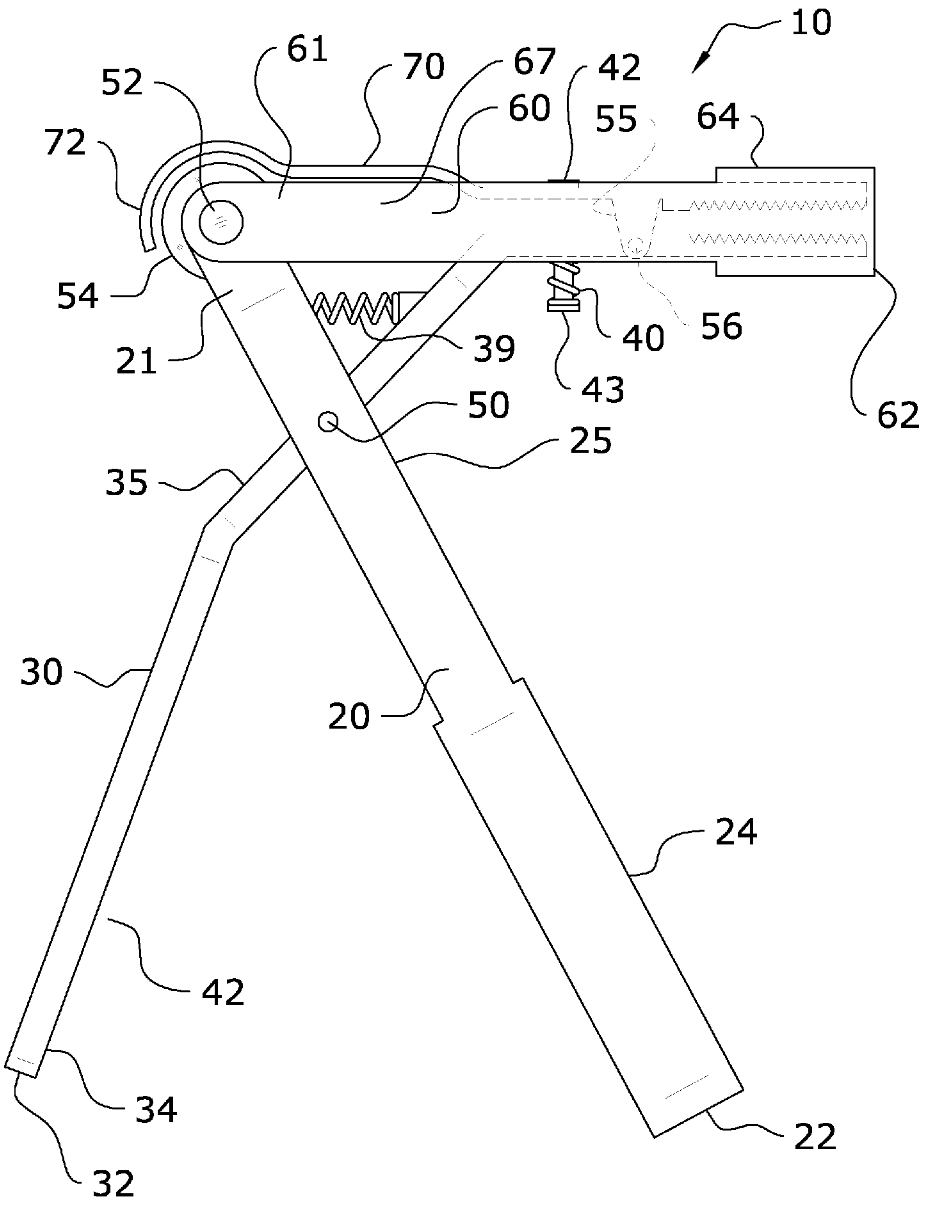
FIG. 2 is a side view of the present invention.

The trigger member 30 and handle 20 will generally be linked by a handle bias member 39 as shown in FIG. 2. The handle bias member 39 will act to revert the trigger member 30 and handle 20 to their original, open position absent any force. The handle bias member 39 may be comprised of various types of biasing mechanisms, such as springs. In a preferred embodiment, the handle bias member 39 will be comprised of a coiled spring which is attached at a first end to the trigger member 30 and at a second end to the handle 20.

The trigger member 30 will generally be comprised of a first portion 34, a second portion 35 and a third portion 36 as shown in FIG. 4. Each portion 34, 35, 36 of the trigger member 30 will generally be comprised of an elongated member, wherein the second portion 35 extends diagonally from the first portion 34 and the third portion 36 extends diagonally from the second portion 35. It is appreciated that each portion 34, 35, 36 of the trigger member 30 may be integrally formed.

The first portion 34 of the trigger member 30 will generally include its second end 32. The second portion 35 of the trigger member 30 will generally extend diagonally between the first and second members 25, 26 of the handle 20 and be pivotally secured thereto via a first pivot member 50. The first pivot member 50 will be comprised of a pin or other structure which allows the second portion 35 of the trigger member 30 to pivot with respect to the handle 20.

The third portion 36 of the trigger member 30 will generally extend horizontally between the first and second members 67, 68 of the horizontal member 60. The distal end of the third portion 36 of the trigger member 30 includes teeth 37 covering a portion thereof adjacent the trigger member's 30 second end 32 for gripping and removing tabs 13 from cans 12.

D. Bias Member

The present invention will generally include a bias member 40 for reverting the position of the clamp member 70 of the present invention absent force. The bias member 40 may be comprised of various types of biasing mechanisms, such as springs. In a preferred embodiment, the bias member 40 will be comprised of a short rod or pin having a first end 42 and a second end 43 wherein the short rod or pin is surrounded by a coiled spring.

The bias member 40 will generally be positioned between the first and second members 67, 68 of the horizontal member 60. The bias member 40 extends through both the third portion 36 of the trigger member 30 and the clamp member 70. The first end 42 of the bias member 40 will generally extend downwardly through the third portion 36 of the trigger member 30 and the second end 43 of the bias member 40 will generally be fixedly secured to the clamp member 70 at a position between its rear and front portions 72, 73 as shown in FIG. 2. The bias member 40 will cause the clamp member 70 and trigger member 30 to each revert back to their open positions when the present invention is not in use.

E. Horizontal Member

The present invention will generally include a horizontal member 60 which will house the third portion 36 of the trigger member 30 and the clamp member 70 of the present invention. The horizontal member 60 will generally include a first end 61 and a second end 62 as shown in FIG. 1, wherein the first end 61 is secured to the first end 21 of the handle 20 via a fastener 52, washer 53 and bearing 54.

The second end 62 of the horizontal member 60 will generally include an enclosed portion 64 which houses the teeth 37, 74 of the third portion 36 of the trigger member 30 and the clamp member 70. The second end 62 of the horizontal member 60 will also generally include a frontal opening 65 as shown in FIG. 1 for receiving and removing tabs 13 from cans 12.

The horizontal member 60 will preferably be comprised of a pair of parallel members 67, 68 which terminate at the enclosed portion 64. The space between the first and second members 67, 68 will accommodate the third portion 36 of the trigger member 30 and the clamp member 70.

Figure 3:
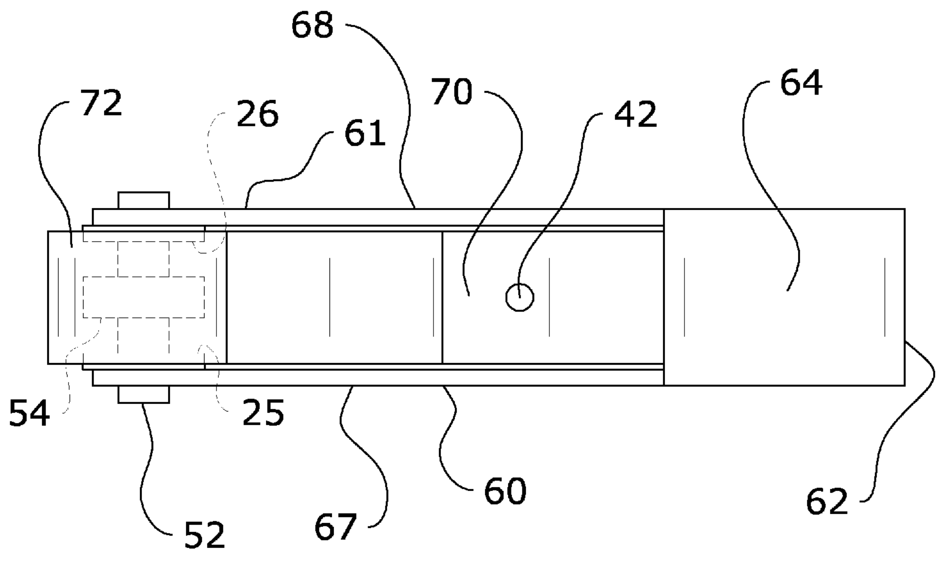
FIG. 3 is a top view of the present invention.
Figure 5:
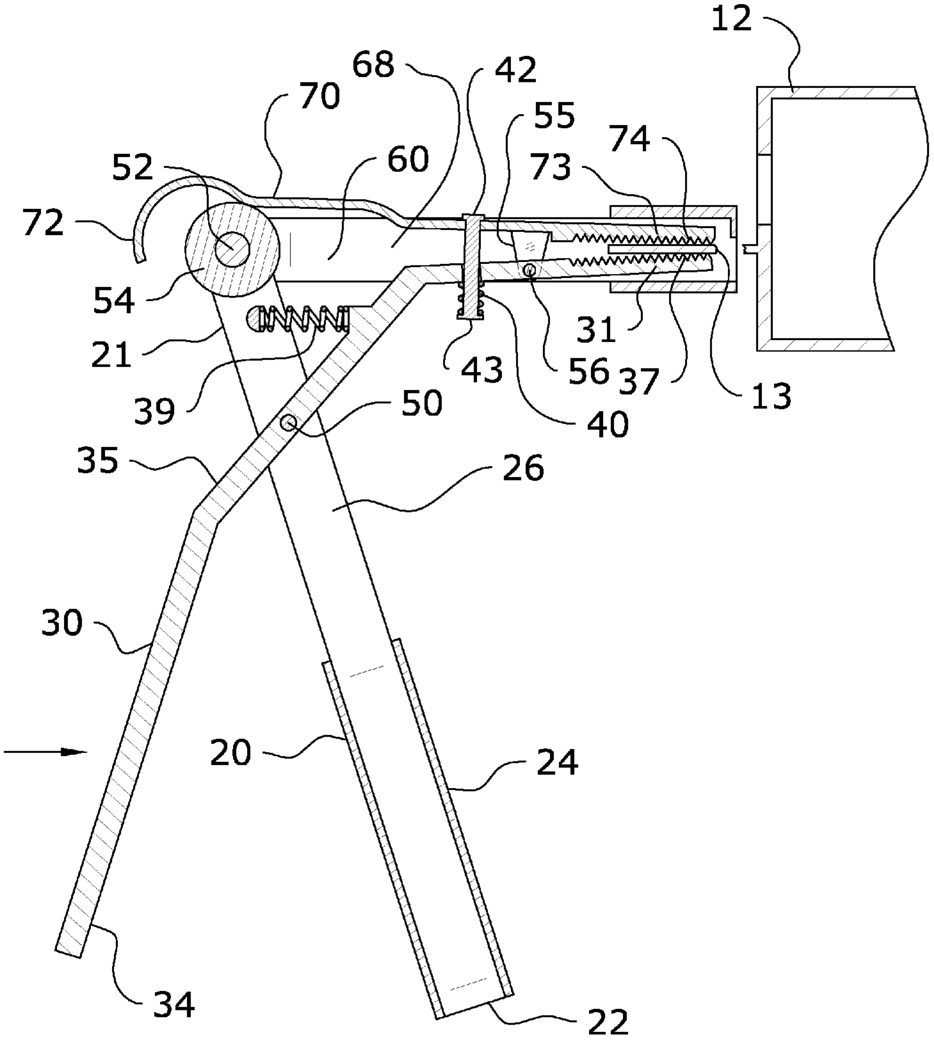
FIG. 5 is a side sectional view of the present invention in use.

A bearing 54 will preferably be positioned between the first member 67 and second member 68 of the horizontal member 60 through use of the fastener 52. The fastener 52 will generally extend through the first member 67 of the horizontal member 60, a first washer 53, the bearing 54, a second washer 53 and finally the second member 68 of the horizontal member 60 as shown in FIG. 3. The rear portion 72 of the clamp member 70 will abut against and move through action of the bearing 54 as shown in FIGS. 4 and 5.

F. Clamp Member

The present invention will generally include a clamp member 70 which acts in combination with the third portion 36 of the trigger member 30 to grip and remove tabs 13 from cans 12. The clamp member 70 will generally be positioned within the horizontal member 60 and include a rear portion 72 and a front portion 73. The rear portion 72 of the clamp member 70 will generally extend around and abut against the bearing 54 as shown in FIG. 1. The front portion 73 of the clamp member 70 will generally be positioned within the enclosed portion 64 of the horizontal member 60 adjacent its front opening 65 and include teeth 74 for gripping a tab 13 of a can 12.

The clamp member 70 will generally be linked to the third portion 36 of the trigger member 30 via a connection member 55 as shown in FIG. 4. The connection member 55 will generally be comprised of a structure which is fixedly attached at an upper end to the clamp member 70 and pivotally attached at a lower end to the third portion 36 of the trigger member 30 via a second pivot member 56. The second pivot member 56 will be comprised of a pin or other structure which allows the connection member 55 to rotate with respect to the third portion 36 of the trigger member 30.

G. Operation of Preferred Embodiment

In use, an operator of the present invention first grips the handle 20 and trigger member 30 of the present invention in his/her hand. The tab 13 of the can 12 is positioned within the frontal opening 65 of the horizontal member 60 between the teeth 37 of the third portion 36 of the trigger member 30 and the teeth 74 of the second end 73 of the clamp member 70.

The operator of the present invention will then apply force to the trigger member 30. As shown in FIGS. 4 and 5, application of force to the trigger member 30 will cause the teeth 37 of the trigger member 30 and the teeth 74 of the clamp member 70 to close around the tab 13 of the can 12. The clamp member 70 will be drawn back over the bearing 54 through the rotational force of the connection member 55 and second pivot member 56, which will cause the teeth 74 of the clamp member 70 to pull the tab 13 off the can 12. The coil spring 40 will also be compressed as force is applied to the trigger member 30. When this force is released, the present invention will revert to its original state and be ready for additional use.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A tab removal device, comprising:

a handle;

a horizontal member secured to said handle;

a trigger member secured to said handle, wherein said trigger member includes a first end and a second end, wherein said second end of said trigger member includes teeth and wherein said teeth of said trigger member are positioned within said horizontal member;

a clamp member extending parallel to said horizontal member, wherein said clamp member includes a first end and a second end, wherein said second end of said clamp member includes teeth and wherein said teeth of said clamp member are positioned within said horizontal member adjacent said frontal opening; and a bias member connecting said trigger member to said clamp member.

2. The tab removal device of claim 1, wherein said handle extends diagonally in a first direction and said trigger member extends diagonally in a second direction.

3. The tab removal device of claim 1, wherein said bias member is comprised of a coil spring.

4. The tab removal device of claim 3, wherein a first end of said bias member is attached to said trigger member and a second end of said bias member is attached to said clamp member.

5. The tab removal device of claim 1, wherein said trigger member is pivotally attached to said handle.

6. The tab removal device of claim 5, further comprising a pivot member attaching said trigger member to said handle.

7. The tab removal device of claim 1, further comprising a fastener and a washer securing said handle to said horizontal member.

8. The tab removal device of claim 1, further comprising a connection member linking said trigger member with said clamp member.

9. The tab removal device of claim 8, wherein said connection member is pivotally connected to said trigger member by a pivot member.

10. A tab removal device, comprising:

a handle;

a horizontal member secured to said handle, wherein said horizontal member is comprised of a first member, a second member extending parallel to said first member and an enclosed portion;

a trigger member secured to said handle, wherein said trigger member includes a first end and a second end, wherein said second end of said trigger member includes teeth and wherein said teeth of said trigger member are positioned within said enclosed portion of said horizontal member;

a clamp member extending parallel to said horizontal member, wherein said clamp member is positioned between said first member and second member, wherein said clamp member includes a first end and a second end, wherein said second end of said clamp member includes teeth and wherein said teeth of said clamp member are positioned within said enclosed portion;

a bearing positioned adjacent said first end of said horizontal member, wherein said bearing is positioned between said first member and said second member of said horizontal member; and a bias member linking said trigger member with said clamp member.

11. The tab removal device of claim 10, wherein said handle extends diagonally in a first direction and said trigger member extends diagonally in a second direction.

12. The tab removal device of claim 10, wherein said bias member is comprised of a coil spring.

13. The tab removal device of claim 12, wherein a first end of said bias member is attached to said trigger member and a second end of said bias member is attached to said clamp member.

14. The tab removal device of claim 10, wherein said trigger member is pivotally attached to said handle.

15. The tab removal device of claim 14, further comprising a pivot member attaching said trigger member to said handle.

16. The tab removal device of claim 10, further comprising a fastener and a washer securing said handle to said horizontal member.

17. The tab removal device of claim 16, wherein said fastener extends through said bearing.

18. The tab removal device of claim 10, further comprising a connection member linking said trigger member with said clamp member.

19. A tab removal device, comprising:

a handle;

a horizontal member secured to said handle, wherein said horizontal member is comprised of a first member, a second member extending parallel to said first member and an enclosed portion;

a trigger member pivotally secured to said handle by a first pivot member, wherein said trigger member includes a first end and a second end, wherein said second end of said trigger member includes teeth and wherein said teeth of said trigger member are positioned within said enclosed portion of said horizontal member, wherein said trigger member includes a first portion, a second portion extending diagonally with respect to said first portion and a third portion extending diagonally with respect to said second portion;

a handle bias member linking said trigger member and said handle;

a clamp member extending parallel to said horizontal member, wherein said clamp member is positioned between said first member and second member, wherein said clamp member includes a first end and a second end, wherein said second end of said clamp member includes teeth and wherein said teeth of said clamp member are positioned within said enclosed portion;

a bearing positioned adjacent said first end of said horizontal member, wherein said bearing is positioned between said first member and said second member of said horizontal member;

a connection member linking said clamp member with said third portion of said trigger member, wherein said connection member is pivotally attached to said third portion of said trigger member by a second pivot member; and a bias member linking said trigger member with said clamp member.

20. The tab removal device of claim 19, wherein said bias member is comprised of a coil spring.

* * * * *